United States Patent [19]

Benn et al.

[11] Patent Number: 4,757,932
[45] Date of Patent: Jul. 19, 1988

[54] CONTROL OF FRICTION AND INERTIA WELDING PROCESSES

[75] Inventors: Bryan L. Benn; Brian Towler, both of Bristol, England

[73] Assignee: Rolls-Royce plc, London, England

[21] Appl. No.: 45,796

[22] Filed: Apr. 24, 1987

Related U.S. Application Data

[63] Continuation-in-part of Ser. No. 873,255, Jun. 6, 1986, abandoned, Continuation of Ser. No. 597,430, Apr. 6, 1984, abandoned.

[30] Foreign Application Priority Data

Apr. 7, 1983 [GB] United Kingdom ............... 8309414

[51] Int. Cl.$^4$ .......................................... B23K 19/02
[52] U.S. Cl. ........................................ 228/2; 228/9; 228/102; 228/113
[58] Field of Search ............... 228/2, 8, 9, 102, 112, 228/113, 114

[56] References Cited

U.S. PATENT DOCUMENTS

| | | | |
|---|---|---|---|
| 3,678,566 | 7/1972 | Ellis et al. | 228/102 |
| 3,720,993 | 3/1973 | Farmer et al. | 228/102 |
| 3,998,373 | 12/1976 | Jones et al. | 228/113 X |
| 4,067,490 | 1/1978 | Jones et al. | 228/102 |

FOREIGN PATENT DOCUMENTS

| | | |
|---|---|---|
| 1254022 | 11/1971 | United Kingdom . |
| 1293141 | 10/1972 | United Kingdom . |
| 1297847 | 11/1972 | United Kingdom . |
| 1439277 | 6/1976 | United Kingdom . |
| 1459126 | 12/1976 | United Kingdom . |
| 2137774 | 10/1984 | United Kingdom . |

OTHER PUBLICATIONS

"Friction Welding of Butt Joints in Metals for High Duty Applications", British Standards Institution, 1982, pp. 1-13.

1125 Machine Moderne, "Control in Friction Welding", 1983, No. 874, pp. 60-62.

Werkstatt und Betrieb, "Friction Welding from the Point of View of the User", 1979, pp. 295-297, vol. 112, No. 5.

Primary Examiner—Nicholas P. Godici
Assistant Examiner—Carmine Cuda
Attorney, Agent, or Firm—Parkhurst & Oliff

[57] ABSTRACT

Known methods of controlling inertia welding and friction welding processes fail to control metal upset, and so require post machining of the welded components. The invention pre-determines the ideal rates of relative rotation, force applied and metal upset rates for a given material to be welded, enters those rates in a microprocessor memory and then connects the microprocessor to the apparatus on which the weld is to be effected. The microprocessor monitors the actual rates, compares them with the ideal rates and, should differences occur, generates signals from those differences with which to adjust operation of the apparatus.

6 Claims, 4 Drawing Sheets

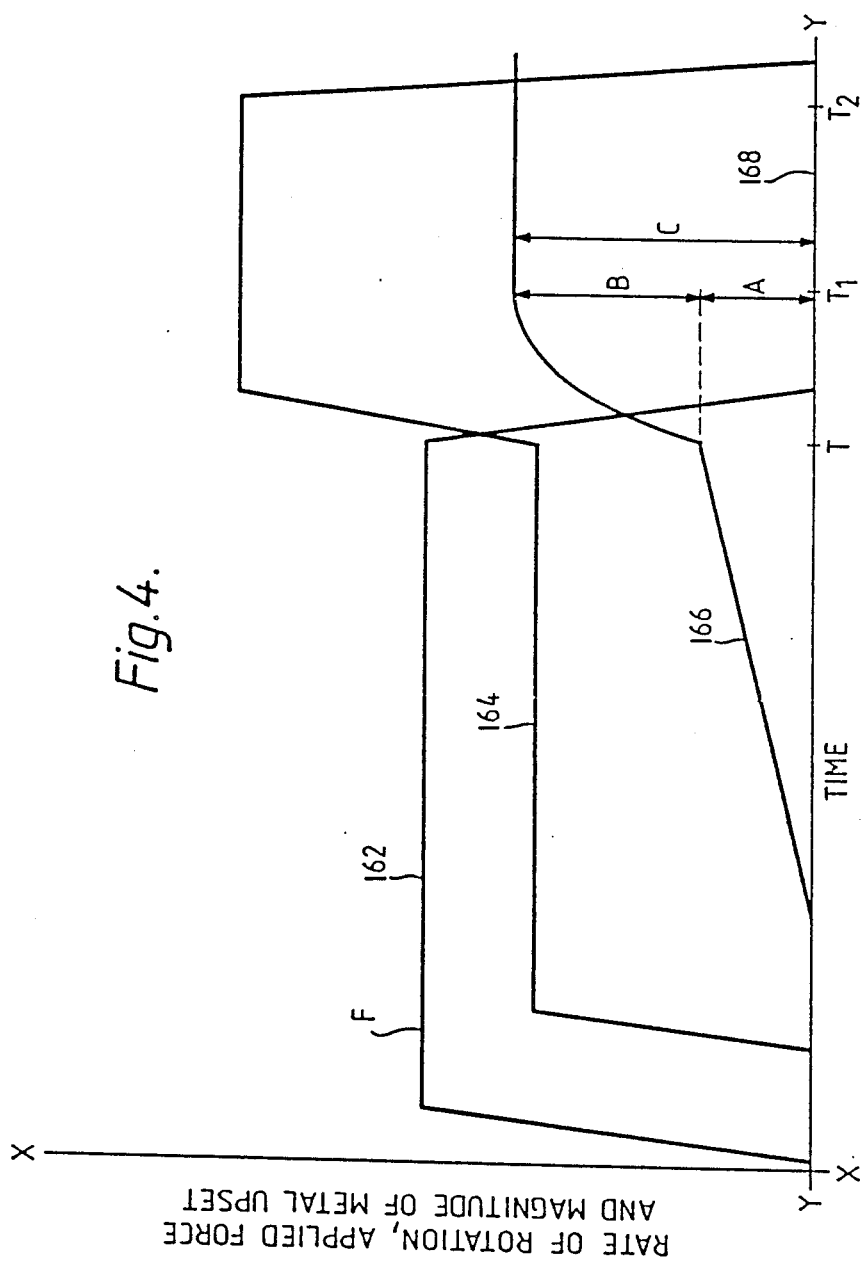

CONTROL OF FRICTION AND INERTIA WELDING PROCESSES

This is a Continuation-in-Part of application Ser. No. 873,255 filed June 6, 1986, now abandoned, which is a continuation of application Ser. No. 597,430 filed Apr. 6, 1984, now abandoned.

BACKGROUND OF THE INVENTION

1. Field of the Invention

The present invention relates to improvements in the control of friction and inertia welding processes. More specifically, the invention concerns an improved apparatus for friction and inertia bonding.

2. Description of Related Art

Inertia welding is a known process for joining two metallic components and comprises fastening one component to and coaxially with a flywheel, driving the flywheel up to a given speed of revolution, thereby generating a given value of energy, and forcing the rotating component against the static component after removing the drive from the flywheel. The energy stored in the flywheel continues to rotate the component and the resultant friction between the relatively rotating components in turn generates sufficient heat, in the first instance to soften the interface and secondly to assist the pressure applied to achieve a solid phase weld.

A friction welding process differs from inertia welding in that the rotary drive is powered, rather than being derived from stored energy, and the rotation may be stopped by means of a brake rather than by dissipation of the stored energy.

During both processes, metal is displaced or "upset" which results in a shortening in the overall axial length of the two components. The total amount by which the length of the two components is reduced may be termed the "upset length". In friction welding, at least, this can be subdivided into an initial "burn off" or "friction" length (a reduction in length caused during a first period of time when heat is being generated to soften the interface) and a "forge length" (a subsequent reduction in length while the applied pressure forges the two components together).

Commonly, the applied pressure is increased after the burn-off length has been achieved, so that the forging pressure is greater than the friction pressure. In inertia welding, there is generally less distinction between these two phases of the welding process. A discussion of such matters may be found in British Standard BS 6223: 1982, published by the British Standards Institution.

UK Patent GB No. 1254022 is an example of friction welding apparatus in which the speed of the drive motor is controlled in accordance with a pre-programmed speed-time relationship. Such techniques are useful for controlling the quality of the resulting weld. However, such techniques give no control over the resulting amount of upset metal, and in particular give no control over the upset length. For example, in friction welding of two typical components by a conventional method, there might be a tolerance of ±0.5 mm in the upset length. Moreover, speed control as shown in GB No. 1254022 is not possible in inertia welding, since it is impossible closely to control the speed of the massive flywheel used, owing to its inertia. In inertia welding of two typical components by a conventional method, since there is no control of the initial burn-off length, there might be a tolerance of ±1 mm in the upset length.

Because there is such a tolerance in the upset length, critical components need to be designed oversize, and a large amount of expensive machining to size is needed after the welding operation. Furthermore, in some applications such as disc-to-disc welding of rotor disc assemblies in gas turbine engines, subsequent machining to size may be impractical or impossible because of the complicated shapes of the components. Accordingly, conventional inertia and friction welding processes are not feasible for such applications.

UK Patent GB No. 1293141 relates to a method of controlling friction weld quality, and states that the rate of the initial burn-off is of more importance than the actual burn-off length. Accordingly, this patent proposes monitoring the burn-off rate (the rate of change of length with respect to time during the initial burn-off period). The burn-off rate is compared with a pre-set reference value and the axial welding pressure is adjusted to keep the burn-off characteristic following a desired straight line. This method cannot control the resulting overall upset length, for two reasons. Firstly, only the rate of metal upset is controlled, for weld quality reasons. This gives no direct control over upset length, and the patent is not concerned with controlling upset length. Secondly, the control is only during the burn-off phase, and there is no suggestion of control during the forging phase, which has an important effect on total upset length.

Another inertia welding process is shown in UK Patent GB No. 1439277. In this patent, in order to provide assurance of the quality of the weld, the pressure, speed and upset are monitored throughout the welding process. Should the pressure, speed or upset stray outside predetermined ranges within which a good quality weld can be assured, an indication of this fact is provided, and the welding process may be automatically stopped. There is no feedback control over the welding parameters. Such a quality control method is only acceptable because in practice the predetermined ranges within which the parameters can vary while still producing a good quality weld are quite wide. Were this not so, a large proportion of the components welded would need to be rejected. For example, ranges of ±7% permissible variation in the nominal, "ideal" weld parameters would be common. The problem with which the present invention is concerned, however, is control of the total upset length in situations where such variation would be intolerable.

SUMMARY OF THE INVENTION

According to the present invention, there is provided apparatus for bonding two components together by friction or inertia welding in which one component is rotated relative to the other component under axial pressure comprising:

driven means for rotating said one component relative to the other, ram means for applying axial pressure to urge the components together, a closed loop pressure control system connected to control the force exerted by the ram including servo control means for controlling the thrust of the ram in response to a pressure control signal, and first transducer means connected with the ram means to provide a continuous output representative of said thrust, second transducer means arranged to produce an output in accordance with an upset length produced by the axial thrust on said relatively rotating components, memory means in which is stored in machine readable form a preferred value of upset length produced by a predetermined axial thrust at each of a plurality of predetermined points during a welding cycle, the memory means being interconnected with computer processing means arranged to produce the pressure control signal for the ram servo control means to provide, at least initially, said predetermined axial thrust, the computer processing means also being connected to receive the outputs of the first and second transducers and being operative at each of said predetermined points during the welding cycle to compare the output of the second transducer with the corresponding stored value of upset length, and to modify the pressure control signal to alter the rate of change of upset length in order that the final upset length produced shall be within a predetermined margin of error of the final preferred upset length.

Preferably, where the welding process is an inertia welding process, the plurality of predetermined points at which the upset length measured by the second transducer is compared with the values stored in the memory means are determined by comparing the ouput of a third transducer representative of the relative speed of rotation of the components in turn with each of a like plurality of predetermined speeds stored in a memory means.

Preferably, where the welding process is a friction welding process apparatus for a continuous drive friction welding process, the plurality of predetermined points at which upset length measured by the second transducer is compared with the values stored in the memory means are determined by reference to predetermined times from the beginning of the welding operation.

BRIEF DESCRIPTION OF THE DRAWINGS

The invention will now be described by way of example and with reference to the accompanying drawings in which:

FIG. 4 is a graph similar to FIG. 2 except that it relates to friction welding.

DETAILED DESCRIPTION OF THE PREFERRED EMBODIMENTS

Figure 1:
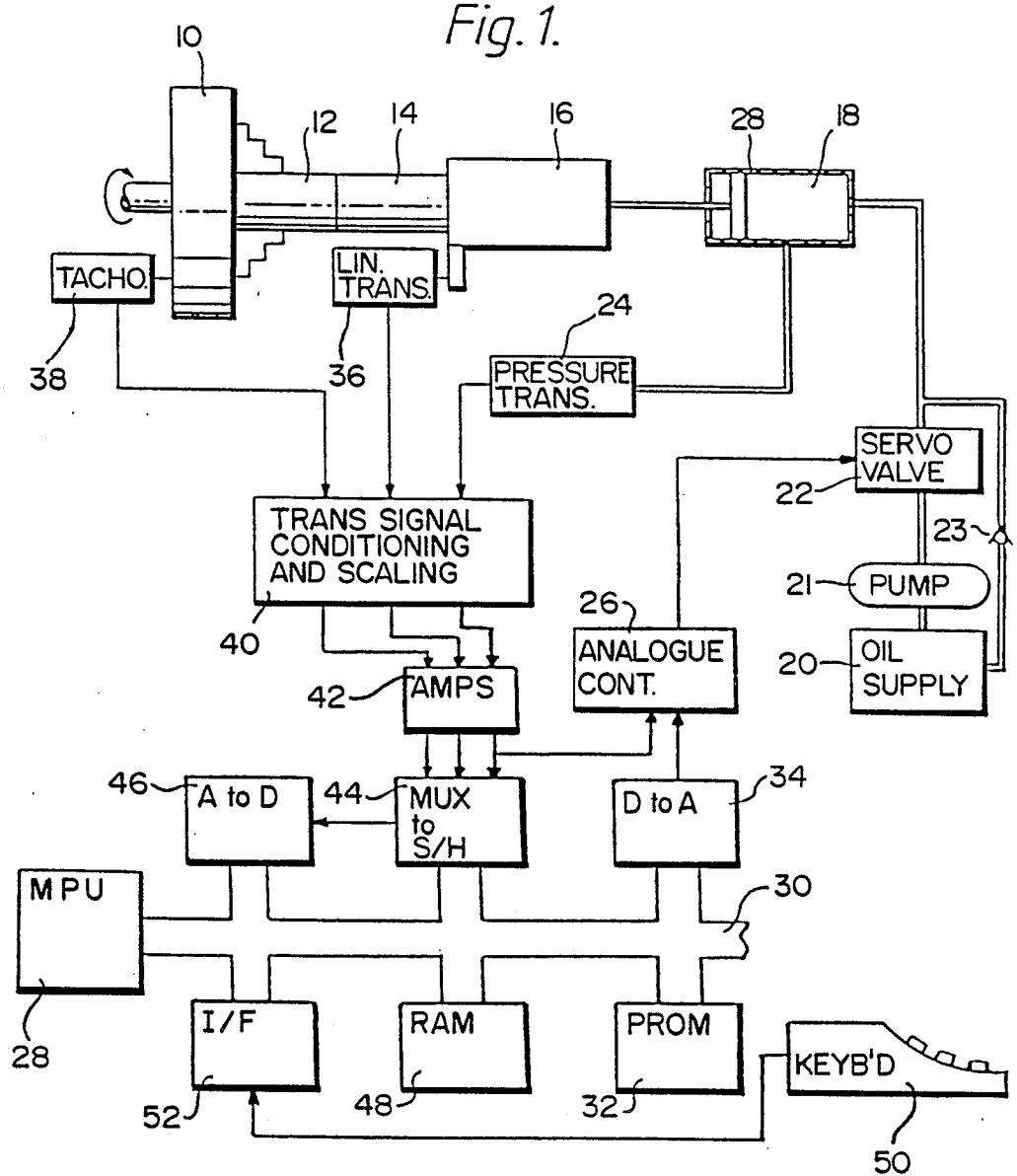
FIG. 1 is a schematic view of apparatus utilized in the operation of the processes in accordance with the invention.

In FIG. 1 a flywheel driven chuck 10 supports a first component 12 for rotation. A further component 14 is rigidly held in a vice 16 which in turn forms part of a hydraulic ram mechanism 18, the function of which is to enable vice 16 and therefore component 14 to move towards and away from component 12.

Ram mechanism 18 is connected to a fluid pressure system consisting of oil supply 20, a pump 21, an electrically operated servo valve 22, and a non-return valve 23. Pressure transducer 24 and analogue controller 26 and the microprocessor system described below for a closed loop system.

The microprocessor system includes a micro-computer processor unit 28 interconnected by data, address and control bus 30 with a programmable read-only memory (PROM) 32, used to store the control system software instructions and data relating to preferred bond characteristics, ie, the stored values of upset length against rotational speed and axial pressure. The pressure control signal for the pressure control loop is constituted by a current drive to the servo valve 22 from analogue controller 26 which, in turn, is driven by the contents of an analogue to digital converter 34 supplied via the bus 30.

The inputs to the microprocessor system are provided by the outputs of three transducers. The pressure transducer 24 comprising a variable reluctance transducer produces a continuous output which is representative of the axial thrust or pressure exerted by the ram 18. A second transducer 36, consisting of a linear displacement transducer, produces a continuous output in accordance with an upset length produced as a result of the said axial thrust. A third transducer 38, comprising a rotary pulse generator or tachometer, produces a continuous output which represents the relative speed of rotation of the components being bonded. Transducer 38 is coupled with the flywheel 10 to directly monitor the instantaneous speed of rotation of the driven one 12 of the components.

The outputs from the three transducers 24, 36 and 38 are supplied to a signal conditioning and scaling unit 40. The rotary transducer 38 generates a frequency signal which is converted by unit 40 to an analogue voltage in a linear range of 0–10 volts. The other two transducer outputs are analogue and are also scaled to a 0–10 volts range. Suitable drive amplifiers, block 42, may be provided to condition and connect the scaled outputs to a multiplexor and sample and hold circuit 44, operation of which is controlled by processor 28 through connections with the bus 30. The multiplexed transducer output samples are loaded into an analogue to digital converter 46 for conversion to 8 bit binary words. These measured outputs of upset, speed and pressure are logged in a random access memory RAM 48. The ideal values of upset, speed and pressure are stored in PROM 32.

Instructions, such as a start cycle instruction, may be entered using a keyboard 50 connected to the system through an interface block 52. It may also be used to obtain read-outs of stored data, for example, a read-out of the RAM contents as a hard copy record of the data relevant to a particular bond.

In a typical example of bonding cycle 2 inch mild steel test pieces were welded together. Initial rotational speed was 2000 rpm, nominal axial pressure was 1500 psi and the flywheel inertia at commencement of the cycle was $190WK^2$. The bond cycle period was approximately 3 seconds. The control system operated at a transducer output sampling frequency of 20 Hz thus providing roughly 60 control points. These parameters give an approximate scale to the axes of FIG. 2.

Figure 2:
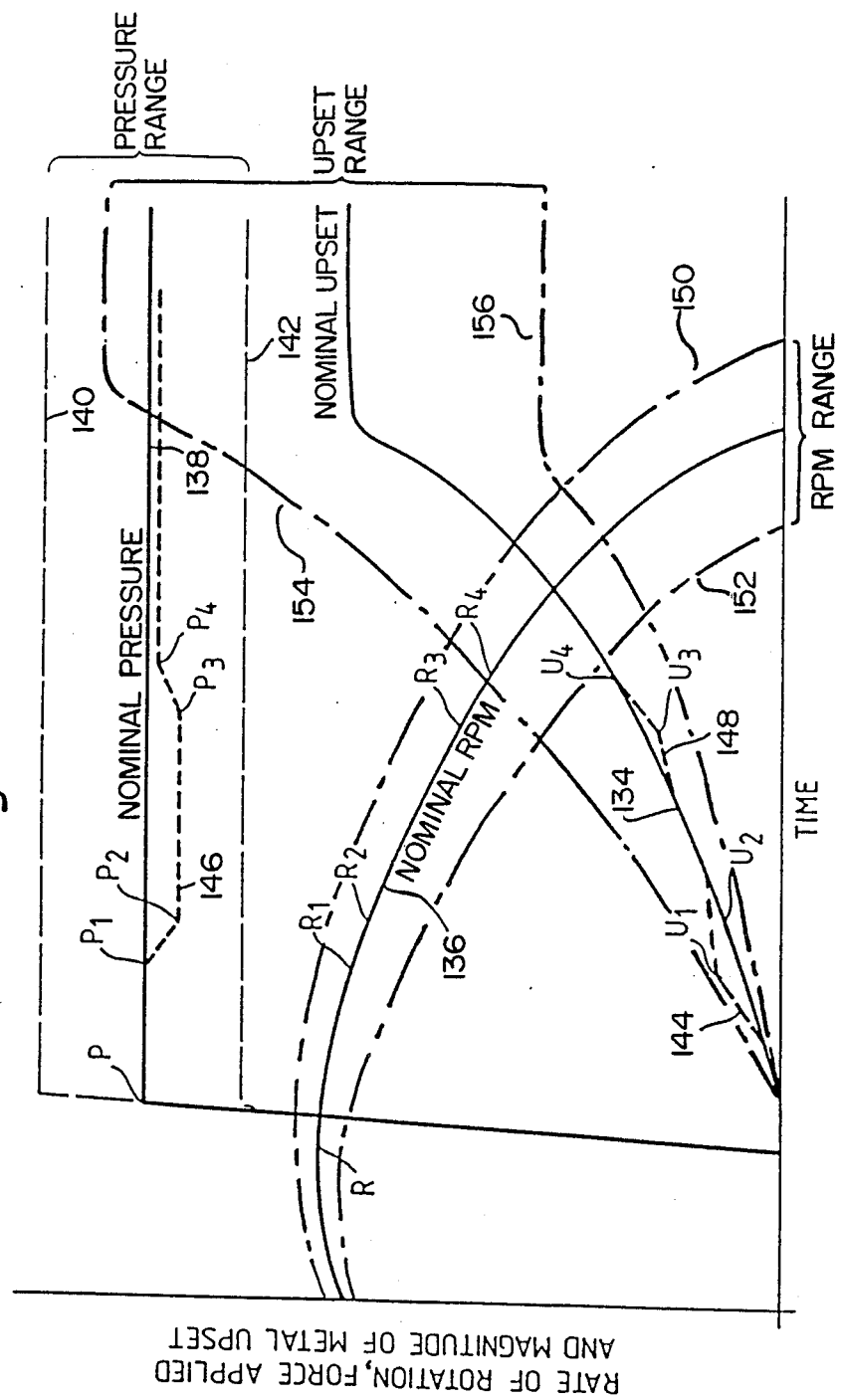
FIG. 2 is a graph of speed of relative rotation of the components, ideal rate of metal upset and force applied plotted against a given time in accordance with one aspect of the present invention relating to inertia welding.

Referring now to FIG. 2, prior to operation of the apparatus to weld together two given components on a production basis, the ideal values of metal upset throughout the welding operation are determined along with the ideal values corresponding thereto of the relative rotation between the two components 12 and 14 (FIG. 1) at a nominal applied force, given applied force through ram mechanism 18 (FIG. 1). This is done in a manner known to those skilled in this art, by means of test welds on sample components of the same size, shape and material as the production components.

Ideal upset values are depicted by the full line 134, and the ideal rate of fall off of relative rotation is depicted by full line 136. The data so obtained is stored in microprocessor memory 32, in the form of a table of values of relative rotation and a table of the corresponding ideal upset values. The nominal applied force is depicted by full line 138 and is bounded by positive and negative value limit lines 140 and 142 respectively, which might be, for example, ±10% of the nominal value 138. These upper and lower limit values are also stored in the memory 32.

At the start of the operation, components 12 and 14 are separated and component 12 is brought up to a predetermined ideal speed of revolution via the power driven flywheel (not shown), the speed of revolution being indicated at point R in FIG. 2. At this point, drive is disconnected so that the flywheel, chuck 10 and, component 12 commence free wheeling and at the same time, components 12 and 14 are brought together under the action of ram mechanism 18. The force applied thus is the nominal force indicated at point P.

The initial meeting of components 12 and 14 (FIG. 1) under the conditions described herein generates friction, reduces the rate of rotation of component 12 and effects softening of the components at their interface. Consequently, the force applied moves component 14 further towards component 12, which movement is sensed by linear transducer 36 and is passed as a signal to the microprocessor 28 where it is compared with the value corresponding to the appropriate point on line 134 of FIG. 2.

The microprocessor 28 will monitor the force applied via pressure transducer 24 and so manipulate the servo valve 22 so as to ensure an appropriate oil delivery to ram mechanism 18. If, however, the actual value of metal upset changes relative to the value depicted by line 134, for example, by way of an increase as indicated by dotted line 144, that change will immediately become apparent by virtue of the microprocessor 28 comparing the signal from the linear transducer 36 with that contained in its memory.

The increase in the value of metal upset at specific values of rate of rotation produces, via the microprocessor 28 changes in the signal to the servo valve 22 which in turn adjusts the oil pressure and hence the force applied through the ram mechanism 18. In the specific example described, when the rate of rotation has fallen to point $R_1$ on line 136 the value of metal upset at point $U^1$ on line 144 is seen to be high relative to the ideal value of metal upset on line 134.

The microprocessor 28 compares the actual value on dotted line 144 with the ideal value on line 134 and manipulates the servo valve 22 to decrease the pressure from $P_1$ by predetermined discrete steps to reduce the actual rate of burn-off. When the rate of rotation has further fallen to point $R_2$ on line 136, the actual metal upset $U_2$ once again is as indicated on line 134 and the pressure has fallen to pressure $P_2$. The microprocessor 28 then manipulates the servo valve 22 to maintain the pressure at $P_2$. Again when the rate of rotation has further fallen to point $R_3$ on line 136 the value of actual upset $U_3$ on line 148 is seen to be low relative to the ideal value of metal upset on line 134. The microprocessor 28 compares the actual value $U_3$ on line 148 with the ideal value on line 134 and manipulates the servo valve 22 to increase the pressure from $P_3$, again by predetermined discrete steps. When the rate has further fallen to $R_4$, the rotation of actual metal upset $U_4$ is again consistent with the ideal value on line 134, and the pressure has increased to pressure $P_4$, the microprocessor 28 manipulates the servo valve 22 to maintain the pressure at $P_4$.

The force applied, however, should never be varied such that it rises or falls beyond the values represented by lines 140 and 142 respectively. Across the range of permissible pressures the amount of energy dissipated in the form of heat will clearly vary and result in the RPM versus time plot varying between the upper and lower limit lines 150 and 152 respectively. It follows also, therefore, that the total upset length must vary, upper and lower limits of which are indicated by lines 154 and 156. It is a basic object of the invention to keep the final upset value within these limits.

Figure 3:
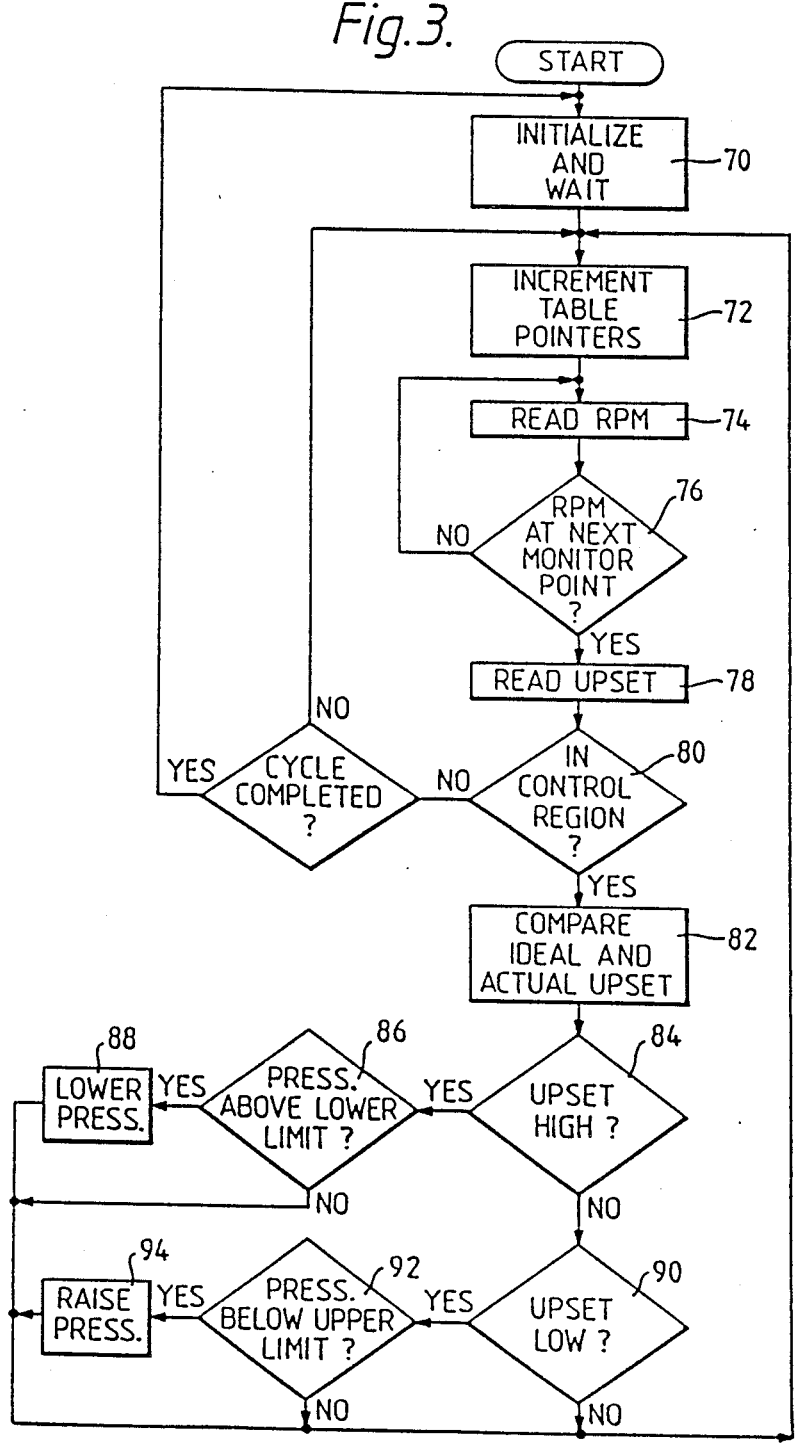
FIG. 3 is a flow chart of a program for a microprocessor unit, for use in operation of the process depicted in FIG. 2.

FIG. 3 is a simplified flowchart of the program followed by the microprocessor in order to achieve the above. In the first stage 70 of the program, the microprocessor initializes itself, and waits for the commencement of a welding cycle. At this stage, pointers to the tables of relative speed of rotation and upset are initialized. Once a welding cycle commences, these table pointers are incremented (stage 72) so as to point to the first values in the tables, and a reading is then taken from the tachometer 38 (stage 74). At decision stage 76, the microprocessor tests whether the speed of rotation (RPM) has fallen to the current value in the table; if it has not, then the program loops back until this test succeeds. The value of upset which has been achieved is now read from the linear transducer 36 (stage 78).

If it is only desired to control the pressure while the weld is actually progressing, and before and after this control region of the process, the microprocessor can be programmed simply to monitor and record the various parameters (by program stages not shown in FIG. 3). So the microprocessor next tests (at stage 80) whether the process is in this control region and loops back if not.

If control is required, the actual upset value read at stage 78 is compared (at stage 82) with the ideal upset value stored at the current location in the table. It will be appreciated that this ideal upset value is that which should have been achieved in an ideal welding operation at the current value of rotational speed, as indicated in FIG. 2. Should the actual upset be higher than the ideal (test stage 84) and if the measured pressure is above the lower limit line 142 (test stage 86), then the servo valve 22 is adjusted to lower the pressure to the ram 18 by a predetermined amount (stage 88). Similarly, the pressure is raised by a predetermined amount (stage 94) if the actual upset is lower than the ideal (test stage 90), and the pressure is below the upper limit 140 (test stage 92). In any event, the program loops back to stage 72, at which the table pointers are incremented, and the program then waits for the rotational speed to fall to the next monitor point, indicated by the new value in the RPM table thus pointed to.

The maintaining of precise control as described herein, while metal upset is occurring, ensures that the ideal quantity of metal is displaced. The final overall length of the welded components 12 and 14 is thus more nearly predictable and obtainable. This, in turn, obviates or at least reduces to a minimum any machining necessary to achieve that dimension. In practice, we have found it possible to control the total upset to within ±5 thousandths of an inch (±127 μm).

This tolerance is thought to be governed by the equipment used rather than being a parameter of a particular welding operation, or particular components, and is relatively independent of the actual value of the total upset. In test weldings of 2 inch (51 mm) diameter cylinders of mild steel, this tolerance was repeatably achieved in a total upset length of 0.187 inches (4.75 mm), which in this particular case is a tolerance of 2.7%. This compares most favorably with the tolerances of conventional methods.

Referring now to FIG. 4, the graph depicts on its vertical X axis the values of relative rotation between components 12 and 14 of FIG. 1, force applied and the magnitude of metal upset, plotted against the ideal times depicted on the horizontal Y axis, over which those values should be attained. The graph is relevant to a friction welding operation, i.e., a process wherein relative rotation of the components is achieved by continuously driving one of them.

Line 162 depicts the ideal speed of relative rotation of components 12 and 14, and line 164 depicts the ideal force, application of which commences at point F when the ideal rate of revolution has stabilized.

Line 166 represents the magnitude of metal upset to be achieved over a given time period depicted by line 168 which is coincident with the Y axis.

The ideal values for each function are entered into the memory of a microprocessor of the kind described in connection with FIG. 1. Force applying means 18 of the kind described in FIG. 1 is provided, as is a linear transducer 36, a pressure transducer 24 and a tachometer 38.

The sampling points are not now determined by a plurality of progressively falling RPM values, as first described above. Instead a plurality of predetermined time periods from the beginning of a welding operation determine when sampling shall take place. In this example these time periods are stored in PROM 32, in place of the RPM values, and compared sequentially with the internal clock of microprocessor 28 to determine the control points.

In the present example, the speed of revolution is achieved by power means (not shown) and consequently is not affected by conditions at the interface. If, however, the value of metal upset varies relative to that represented by line 166 in FIG. 4, i.e. the upset which should be achieved in a time represented by line 168 has not been achieved or has been exceeded, the relevant signals will be entered in the microprocessor 28, compared, and an appropriate correcting signal issued by the microprocessor 28 to the servo valve 22 to the force applying means 18. Thus, if dimension 'A' which represents the desired quantity of metal to be displaced is being approached at a rate which indicates that it will be achieved before time 'T' is reached, the force being applied will be reduced on instruction from microprocessor 28 (FIG. 1). Similarly, if dimension 'B' which represents the desired magnitude of metal upset during the final joining stage of the process is being achieved in some time which is different from that indicated by $T_1$, the force applied will be varied appropriately, by signals generated in microprocessor 28 (FIG. 1). The microprocessor thus ensures that the total magnitude of metal upset is limited to that indicated by dimension 'C', and on that being achieved a signal is generated which maintains a force for a time $T_2$ before switching off of the apparatus. It will be seen that whereas the apparatus of FIG. 1 compares the actual and ideal values of the upset at predetermined values of RPM, the present apparatus performs this comparison at predetermined times. The program to be followed may be generally similar to that of FIG. 3, except that instead of waiting for the RPM to fall to the next monitor value, the program samples and compares the upset at the appropriate predetermined times throughout the welding operation. In particular, the program may include the steps 86, 88, 92, and 94 of FIG. 3, to ensure that the applied pressure remains within pre-determined limits.

While the above embodiments have been described as microprocessor based units, it will be appreciated that other forms of data processing means can be used if desired.

What is claimed is:

1. Apparatus for bonding two components together by friction or inertia welding in which one component is rotated relative to the other component under axial pressure comprising:

driven means for rotating said one component relative to the other, ram means for applying axial pressure to urge the components together, a closed loop pressure control system connected to control the force exerted by the ram, including servo control means for controlling the thrust of the ram in response to a pressure control signal, and first transducer means connected with the ram means to provide a continuous output representative of said thrust, second transducer means arranged to produce an output in accordance with an upset length produced by the axial thrust on said relatively rotating components, memory means in which is stored in machine readable form a preferred value of upset length produced by a predetermined axial thrust at each of a plurality of predetermined points during a welding cycle, the memory means being interconnected with computer processing means arranged to produce the pressure control signal for the ram servo control means to provide, at least initially, said predetermined axial thrust, the computer processing means also being connected to receive the outputs of the first and second transducers and being operative at each of said predetermined points during the welding cycle to compare the output of the second transducer with the corresponding stored value of upset length, and to modify the pressure control signal to alter the rate of change of upset length in order that the final upset length produced shall be within a predetermined margin of error of the final preferred upset length.

2. Apparatus according to claim 1 for an inertia welding process wherein the plurality of predetermined points at which the upset length measured by the second transducer is compared with the values stored in the memory means are determined by comparing the output of a third transducer representative of the relative speed of rotation of the components in turn with each of a like plurality of predetermined speeds stored in a memory means.

3. Apparatus according to claim 2 wherein the computer processing means is operative to compare the output of the first transducer with the modified pressure control signal, and only utilizes said modified pressure control signal to raise the axial pressure if the pressure represented by the output is below a predetermined upper limit, and only utilizes said modified pressure control signal to lower the axial pressure if the pressure represented by the output is above a predetermined lower limit.

4. Apparatus according to claim 1 wherein the computer processing means is operative to compare the output of the first transducer with the modified pressure control signal, and only utilizes said modified pressure control signal to raise the axial pressure if the pressure represented by the output is below a predetermined upper limit, and only utilizes said modified pressure control signal to lower the axial pressure if the pressure represented by the output is above a predetermined lower limit.

5. Apparatus according to claim 1 for a continuous drive friction welding process, wherein the plurality of predetermined points at which upset length measured by the second transducer is compared with the values stored in the memory means are determined by reference to predetermined times from the beginning of the welding operation.

6. Apparatus according to claim 3 wherein the computer processing means is operative to compare the output of the first transducer with the modified pressure control signal, and only utilizes said modified pressure control signal to raise the axial pressure if the pressure represented by the output is below a predetermined upper limit, and only utilizes said modified pressure control signal to lower the axial pressure if the pressure represented by the output is above a predetermined lower limit.

* * * * *